US009623960B2

(12) United States Patent
Devenyi (10) Patent No.: US 9,623,960 B2
(45) Date of Patent: Apr. 18, 2017

(54) AIRCRAFT WING HAVING CONTINUOUSLY ROTATING WING TIPS

(71) Applicant: Gabor Devenyi, Tiny Twp (CA)

(72) Inventor: Gabor Devenyi, Tiny Twp (CA)

(73) Assignee: Gabor Devenyi, Tiny Township (CA)

( * ) Notice: Subject to any disclaimer, the term of this patent is extended or adjusted under 35 U.S.C. 154(b) by 135 days.

(21) Appl. No.: 13/955,639

(22) Filed: Jul. 31, 2013

(65) Prior Publication Data

US 2015/0102156 A1    Apr. 16, 2015

Related U.S. Application Data

(60) Provisional application No. 61/677,673, filed on Jul. 31, 2012.

(51) Int. Cl.
*B64C 23/06* (2006.01)
*B64C 39/10* (2006.01)

(52) U.S. Cl.
CPC ............ *B64C 23/065* (2013.01); *B64C 39/10* (2013.01); *Y02T 50/164* (2013.01)

(58) Field of Classification Search
CPC ..... B64C 23/065; B64C 27/28; B64C 27/473; B64C 2201/102; B64C 1/12; B64C 27/33; B64C 27/35; B64C 39/00; B64C 3/10; B64C 25/10; B64C 7/00; B64C 9/00; Y02T 50/164; Y02T 50/145; Y02T 50/162; Y02T 50/433
USPC .... 244/7 A, 7 C, 39, 199.4, 99.14, 16, 17.11
See application file for complete search history.

(56) References Cited

U.S. PATENT DOCUMENTS

| 3,107,888 A | * | 10/1963 | Finn | A63H 27/08 244/153 A |
| 3,743,218 A | * | 7/1973 | Sweeney et al. | 244/36 |
| 3,900,176 A | * | 8/1975 | Everett | B64C 27/30 244/39 |
| 3,997,136 A | * | 12/1976 | Finn | A63H 27/08 244/153 A |
| 4,247,063 A | * | 1/1981 | Jenkins | 244/91 |
| 4,358,077 A |   | 11/1982 | Coronel | |
| 4,671,473 A | * | 6/1987 | Goodson | 244/199.4 |
| 4,722,499 A | * | 2/1988 | Klug | 244/199.4 |
| 4,998,689 A |   | 3/1991 | Woodcock | |
| 5,100,085 A | * | 3/1992 | Rubbert | B64C 23/065 244/199.3 |
| 6,345,790 B1 | * | 2/2002 | Brix | 244/199.4 |
| 6,997,413 B2 |   | 2/2006 | Wukowitz | |

(Continued)

FOREIGN PATENT DOCUMENTS

| DE | 3103095 A1 | 8/1982 |
| GB | 2237254 A | 5/1991 |

*Primary Examiner* — Joseph W Sanderson
*Assistant Examiner* — George Andonyan
(74) *Attorney, Agent, or Firm* — Reising Ethington P.C.

(57) ABSTRACT

The present invention relates to a wing for an aircraft. The wing includes a main wing section extending from an inboard end to an outboard end along a lateral axis of the wing, the inboard end for connecting the main wing section to the aircraft. The wing also includes a wing tip having a proximal end and a distal end, the wing tip being rotatably mounted at the proximal end to the outboard end of the main wing section and arranged to freely rotate about a wing tip rotational center with respect to the main wing section.

25 Claims, 9 Drawing Sheets

(56) References Cited

U.S. PATENT DOCUMENTS

| | | | |
|---|---|---|---|
| 7,335,000 B2* | 2/2008 | Ferguson | F03D 3/002 |
| | | | 416/4 |
| 7,757,992 B2* | 7/2010 | Bussom et al. | 244/17.25 |
| 8,083,185 B2* | 12/2011 | Konings et al. | 244/199.4 |
| 8,350,403 B2* | 1/2013 | Carroll | B64C 39/022 |
| | | | 290/44 |
| 8,783,623 B2* | 7/2014 | Schaber | 244/199.3 |
| 9,145,207 B2* | 9/2015 | Moschetta | B64C 25/36 |
| 2008/0191099 A1 | 8/2008 | Werthmann et al. | |
| 2008/0308683 A1* | 12/2008 | Sankrithi et al. | 244/199.4 |
| 2010/0303634 A1* | 12/2010 | Long | B63B 35/7926 |
| | | | 416/90 A |
| 2013/0206921 A1* | 8/2013 | Paduano et al. | 244/7 |
| 2015/0028155 A1* | 1/2015 | Reiter | B64C 27/16 |
| | | | 244/39 |

* cited by examiner

AIRCRAFT WING HAVING CONTINUOUSLY ROTATING WING TIPS

RELATED APPLICATION

The application claims the benefit of 35 USC 119(e) to U.S. Provisional Application Ser. No. 61/677,673 filed 31 Jul. 2012 (Jul. 31, 2012).

TECHNICAL FIELD

The present invention relates to an aircraft wing, and more particularly, to a static aircraft wing or fixed airplane wing having freely rotating wing tips.

BACKGROUND

In general aviation, according to established aerodynamic stability and control law, an aircraft should be stable in three major directions or axes.

These three directions are: longitudinal or directional axis along a fuselage (roll axis); lateral axis along a wing span, wing tip to wing tip (pitch axis); and a vertical axis, perpendicular to the longitudinal axis (yaw axis).

In an entire flight envelope, the aircraft must maintain stability. Any change in the stability margin of one axis will affect the other two axes or directions. Generally, directional stability is provided by a vertical stabilizer and controlled by a rudder. Pitch stability is provided by a horizontal stabilizer and controlled by an elevator. The dihedral and taper of the wing, as well as magnitude of the wing tip lift coefficient provides lateral stability and is controlled by ailerons arranged at each wing tip or close to the wing tips.

The stability of an aircraft depends on the location of the centre of gravity of the aircraft with respect to the mean lift line or centre of lift of the wing. As long as the centre of gravity is in front of the centre of lift of the wing, there will be an automatic stability built into the aircraft in proportion to the distance between the centre of lift and the centre of gravity. If this distance is large, the stability margin will also be large, but because of the large stability, the control surfaces (elevator, aileron, rudder) must be made large and have large displacement in order to have the desired effect.

A well balanced aircraft control design calls for a solid feel on all control axis with a minimum of control surface area, and actuation motion involved, in order to maintain a low aerodynamic drag. The speed range of an aircraft depends strongly on the wing area, the wing span and the lift coefficient of the wing profile, as well as the configuration and the effectiveness of the controls.

In general, the lower the coefficient of lift and the smaller the wing area while the aircraft is in cruise mode (relative high speed with minimum aero drag), the faster the aircraft will be, given the horsepower available.

During a flight, the limit of low speed operation of an aircraft is related to the particular wing design with its attendant stall speed; more precisely, the stall of the wing tip. The upper speed range is limited by the shape or profile drag, along with a given wing area and wing span, and are dominant components of the aerodynamic drag produced by the aircraft at high speed.

An aircraft must be able to operate in a wide speed range, including some very low speed manoeuvres during take off and landing, due to restricted length of landing fields and the need for low kinetic energy dissipation at touchdown. The wide speed range requirement for an aircraft presents conflicting design parameters. In low speed operation the lift of an aircraft wing is greatly reduced, which must be restored by increasing the angle of attack (the angle which the wing is positioned to the local airflow). Critically, at low speeds, as well as high speeds regardless of wing profile shape or wing plan form, after a certain positive angle to the incoming airflow, the airflow will detached from the upper part of the wing, causing the wing to lose most of its lift and be in a near stalled condition.

During a stall, the lift-induced drag (which is dominant at low speed operation) will greatly increase, slowing down the aircraft and stalling the wing even further. This condition is aggravated even more when the aircraft has to turn during the slow speed flight. The inner wing, respective to a turning direction of the aircraft, in a turn, will have a slower airflow over it due to the fact that the inner wing tip is closer to the turning centre than the outer wing tip. In addition, the steeper the bank angle the lower the lift available from the inner (lower) wing which must be compensated by applying an opposite aileron (moving down to increase the lift) of the down-moving wing. This will greatly increase the chance of completely stalling the inner wing and losing lateral control during the turn.

The conventional method to reduce this effect is to lower the incident angle of the wing tips (lower angle of attack) with respect to the rest of the wing, as well as using a wider stalling range airfoil at the wing tips.

Conventionally, aerodynamic solutions have been limited by the maximum allowable angle of attack of the wing designed employed. Further to the wing stalling problem in all configurations, stalling of the wing tips is detrimental to the lateral stability of the aircraft due to the fact that the ailerons are located at the wing tips or close by, and are controlling the lateral orientation of the wing. With the wing tip in a stalled state, the wing (aircraft) will enter a spiral dive towards the inner or lower wing. Statistically, the highest incident rate in general aviation is related to stall and spin accidents during the slow speed regime of flight, specifically during the takeoff and landing manoeuvres.

Traditionally, an overall compromised solution was needed for wider speed range aircraft designs. For the price of reduced high-speed performance, the wing span and the wing area may be increased and a higher lift airfoil may be used for the wing design. This configuration will provide more lift at lower speeds and more aerodynamic drag at higher speeds.

Conventionally, to improve this situation, a reasonably small wing is utilized with trailing and/or leading edge flaps applied during the slow speed operation, in order to increase the lift available to the aircraft. The application of the flaps imparts a large negative pitching or diving moment to the wing that must be controlled by horizontal stabilizers that are sufficiently sized to provide a stabilizing force. In addition, the conventional flaps generate increase lift only to the inner 40% to 60% of the wing, leaving the outer wing and the wing tips at a low lift coefficient, reducing the lateral stability when it is needed the most.

As the aircraft turns at low speeds, the inner wing dips into the turn, producing less lift than the outer wing tip that must be compensated by a down-applied aileron to "pick up" the inner wing and to increase the lift coefficient. This may stall the inner wing leading to a spin or spiral dive at close proximity to the ground (takeoff and landing) where recovery may not be possible.

Therefore there is a need for an improved approach to the lateral stability and reliability of lift produced by an aircraft wing that is stall-spin proof during low speed manoeuvring.

The present invention addresses this need, and provides further related advantages.

SUMMARY OF THE INVENTION

The present disclosure provides a static aircraft wing or fixed airplane wing having freely rotating wing tips, and an aircraft having the same.

In one aspect the present disclosure provides a wing for an aircraft comprising a main wing section extending from an inboard end to an outboard end along a lateral axis of the wing, the inboard end for connecting the main wing section to the aircraft; and at least one wing tip having a proximal end and a distal end, the at least one wing tip being rotatably mounted at the proximal end to the outboard end of the main wing section and arranged to freely spin with respect to the main wing section in response to airflow incident on the at least one wing tip about a wing tip rotational centre that is parallel to or coaxially aligned with the mean lift line of the wing.

In a further aspect, a total surface area of the wing tip is between 2% to 20% of a total surface area of the aircraft wing.

In a further aspect, a thickness of the wing tip is between 6% to 20% of a median chord length of the wing tip.

In a further aspect, the wing tip rotational centre is arranged proximal to a mean lift line of the main wing section or the wing tip rotational centre and the mean lift line of the main wing section are coaxially aligned.

In a further aspect, the main wing section comprises a static wing or fixed wing.

In a further aspect, the wing includes a locking mechanism operable to fix the wing tip to the main wing section in a locked position preventing rotation of the wing tip, and operable to release the wing tip from the locked position where the wing tip is free to rotate about the wing tip rotational center.

In a further aspect, in the locked position the wing tip is in a feathered position where an incident angle of the wing tip is aligned with the main wing section.

In a further aspect, the locking mechanism includes a sliding pin and an associated locking aperture sized to receive the sliding pin.

In a further aspect, the proximal end of the rotating wing tip defines the associated locking aperture and the sliding pin extends from and retracts toward the outboard end of the main wing section.

In a further aspect, the wing includes a stub spar extending from the main wing section for rotatably supporting the wing tip.

In a further aspect, the stub spar is a tubular stub spar.

In a further aspect, the wing includes a roller bearing disposed about the tubular stub spar, wherein the proximal end of the wing tip defines a laterally protruding tubular bearing support sized to receive the roller bearing.

In a further aspect, the tubular stub spar extends through the bearing support, and the roller bearing is interposed between the tubular stub spar and the bearing support to rotatably couple the wing tip to the main wing section.

In a further aspect, the wing comprises a drive assembly for rotationally driving the wing tip, the drive assembly includes a torque motor coupled to a drive shaft and extends from the main wing section to engage with the wing tip.

In a further aspect, the wing includes a roller clutch arranged between the drive shaft and the wing tip, the roller clutch being operable for one-way up-rotation of the wing tip with respect to the drive shaft so that the wing tip is rotatable in a rotational direction at a speed greater than the rotational speed of the drive shaft.

In a further aspect, the wing includes a drive assembly for rotationally driving the wing tip, the drive assembly includes a torque motor coupled to a drive shaft and extends from the main wing section through the tubular stub spar and engages with the wing tip.

In a further aspect, the wing includes a roller clutch arranged between the drive shaft and the wing tip, the roller clutch being sized to be received by a clutch support housing defined by the distal end of the wing tip, the roller clutch being operable for one-way up-rotation of the wing tip with respect to the drive shaft so that the wing tip is rotatable in a rotational direction at a speed greater than the rotational speed of the drive shaft.

In a further aspect, the wing includes at least one roller bearing disposed about the drive shaft and interposed between the drive shaft and the tubular stub spar for rotational support of the drive shaft.

In a further aspect, the torque motor is arranged in the main wing section.

In a further aspect, the wing includes a braking mechanism operable to apply a braking force to stop the free rotation of the wing tip, operable to rotate the wing tip to a desired incident angle with respect to the main wing section, and operable to return the wing tip to the feathered position where the incident angle of the wing tip is aligned with the main wing section.

In a further aspect, the braking mechanism is arranged in the wing tip.

In a further aspect, the wing tip is operable to freely rotate continuously up to a steady state of dynamic lift-induced R.P.M.

In yet a further aspect, the present invention resides in an aircraft including wings having wing tips in accordance with any one of the forgoing aspects. The wing tip of the opposing wings may be mechanically linked to one another, and may be motor driven independently, intermittently or differentially driven from one another.

BRIEF DESCRIPTION OF THE DRAWINGS

Reference may now be made to the following detailed description taken together with the accompanying drawings in which.

DETAILED DESCRIPTION OF THE DRAWINGS

The following detailed description is merely exemplary in nature and is not intended to limit the described embodiments or the application and uses of the described embodiments. Furthermore, there is no intention to be bound by any expressed or implied theory presented in the preceding technical field, background, brief summary or the following detailed description.

As used herein, the term "aircraft" means any one of a number of vehicles that include one or more fixed wings attached to a fuselage or aircraft body. The term "aircraft" is intended to include, but is not limited to, airplanes, gliders, compound helicopters, missiles, rockets, satellites, spacecraft, and spaceplanes. Embodiments will be described herein with respect to fixed-wing airplanes, and it is to be understood that some or all of the described embodiments may also be applied to other types of aircraft, in alternate embodiments. Accordingly, the scope of at least some of the appended claims is intended to encompass those alternate embodiments.

Reference will now be made to FIGS. 1 to 5 which illustrate an embodiment of the present disclosure.

Figure 1:
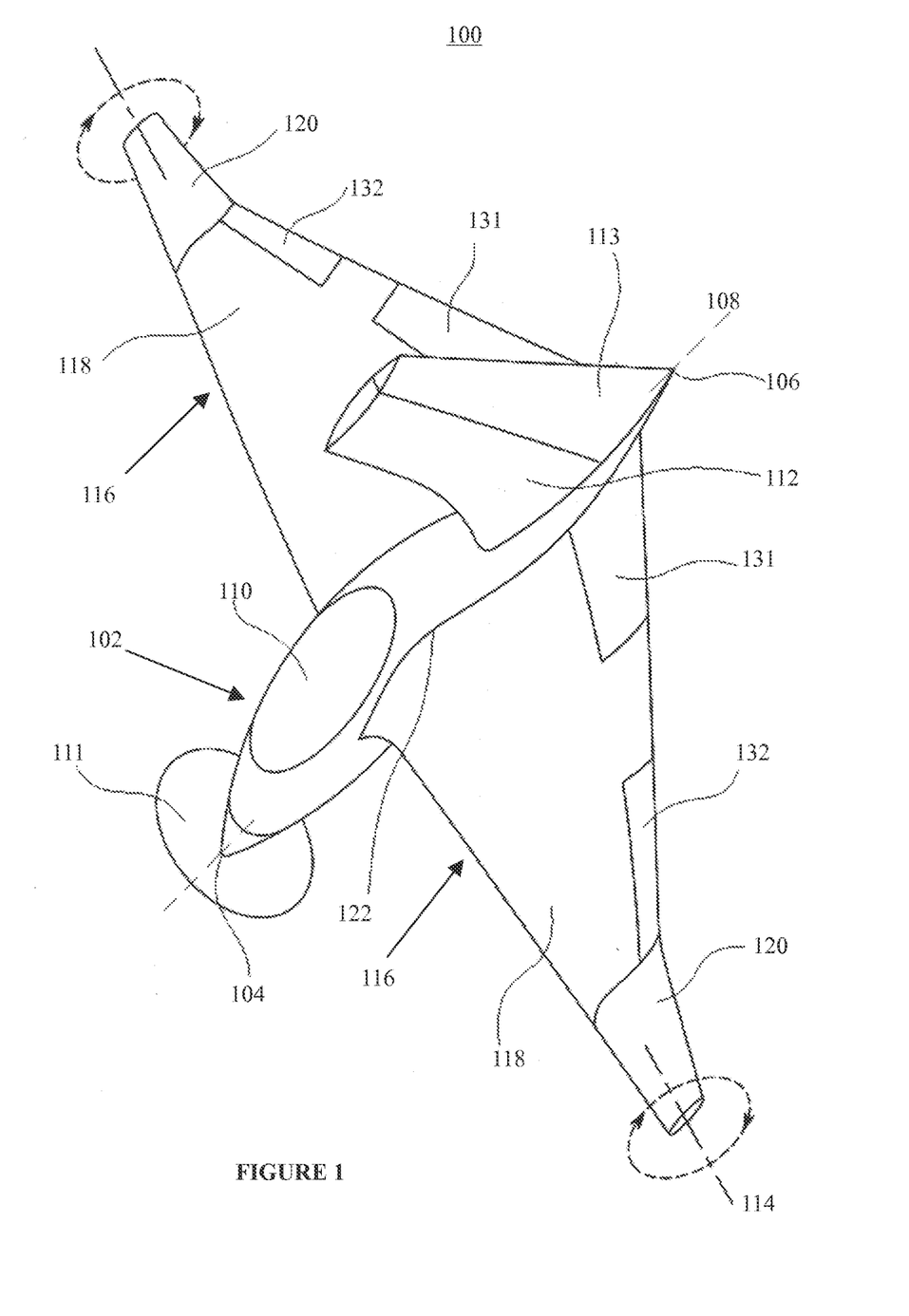
FIG. 1 illustrates a top perspective view of an aircraft having freely rotating wing tips in accordance with an embodiment of the present invention.
Figure 2:
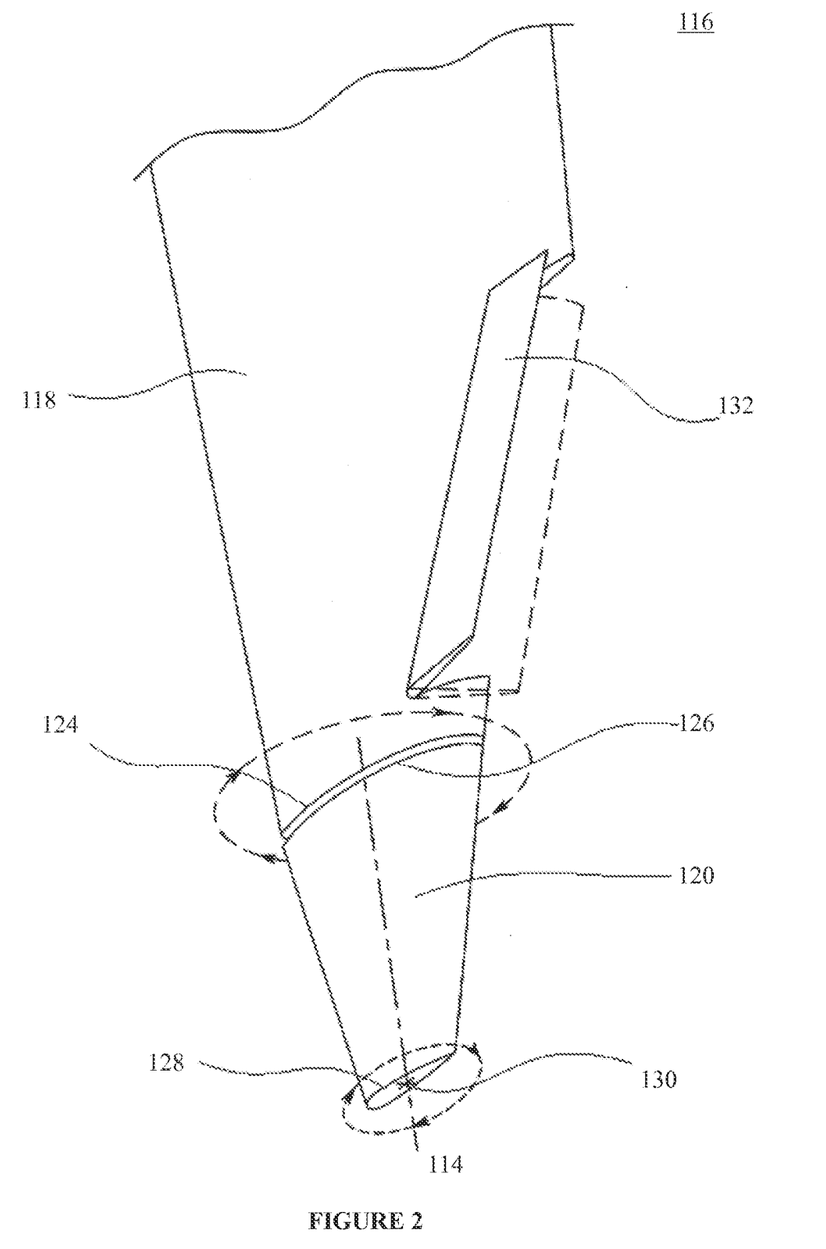
FIG. 2 illustrates a partial perspective view of the aircraft wing shown in FIG. 1.

FIG. 1 illustrates a top perspective view of an aircraft 100 having freely rotating wing tips 120. The aircraft 100 includes a fuselage 102 extending from a nose end 104 to a tail end 106 along a longitudinal axis 108, also known as the roll axis. The fuselage 102 houses a cockpit 110 for a pilot to control and operate the aircraft 100, and may also include a cabin for passengers and/or a cargo bay for storage.

A propeller 111 is mounted to the nose end 104 of the fuselage 102 to provide thrust to the aircraft 100, and a vertical stabilizer 112 is arranged on the fuselage towards the tail end 106. A rudder 113 is rotatably mounted to the vertical stabilizer 112 and is used to rotate the nose end 104 of the fuselage 102 about a vertical axis of the aircraft 100, also known as a yaw axis. In other embodiments, the aircraft 100 may also include a horizontal stabilizer having a rotatably connected elevator used to rotate the nose end 104 of the fuselage 102 about a lateral axis 114 of the aircraft 100, also known as a pitch axis. The aircraft 100 may also include one or more engines fixedly attached to the aircraft 100 to provide thrust, as is known in the art.

Two wings 116 are attached to opposing sides of the fuselage 102. The design of the wings 116 should generally follow standard "static" wing design practice. Preferably the plan form design of the wing 116 is a slightly swept forward configuration.

Each wing extends along the lateral axis 114 and includes a main wing section 118 and the rotating wing tip 120. The main wing section 118 has an inboard end 122 connected to the fuselage 102, and extends to an outboard end 124. Arranged proximal to the inboard end 122 are elevators 131 which are used to provide pitch control, and ailerons 132 rotatably connected to the main wing section 118 towards the outboard end 124 are used to rotate the aircraft 100 about the longitudinal axis 108.

The wing tip 120 is rotatably mounted at a proximal end 126 to the outboard end 124 of the wing main section 118, and extends from the proximal end 126 to a distal end 128. The wing tip 120 is rotatably mounted to the main wing section 118 to freely rotate about a wing tip rotational centre 130 (shown in FIG. 2). Preferably the wing tip rotational centre 130 is arranged on or close to a mean lift line (centre of lift) of the main wing section 118 it is attached to. In this location, the application of the rotating wing tips will not influence the pitch trimming of the wing (aircraft).

The overall surface area of the main wing section 118 may be reduced when the rotating wing tips 120 are employed, due to the fact that the main wing section 118 can reach maximum coefficient of lift without danger of stalling at the wing tips 120 and losing the attendant lateral stability. A total surface area of the wing tip 120 is preferably selected to be between 2% to 40%, and more preferably between 2% to 20%, of the total surface area of the wing 116, and a thickness of the rotating wing tip 120 is selected to be 6% to 20% of the median chord length of the wing tip 120. If the thickness of the wing tip 120 exceeds more than 20% of the median chord length of the wing tip 120, the wing tip (airfoil) will not auto rotate in lower air speeds.

Figure 3:
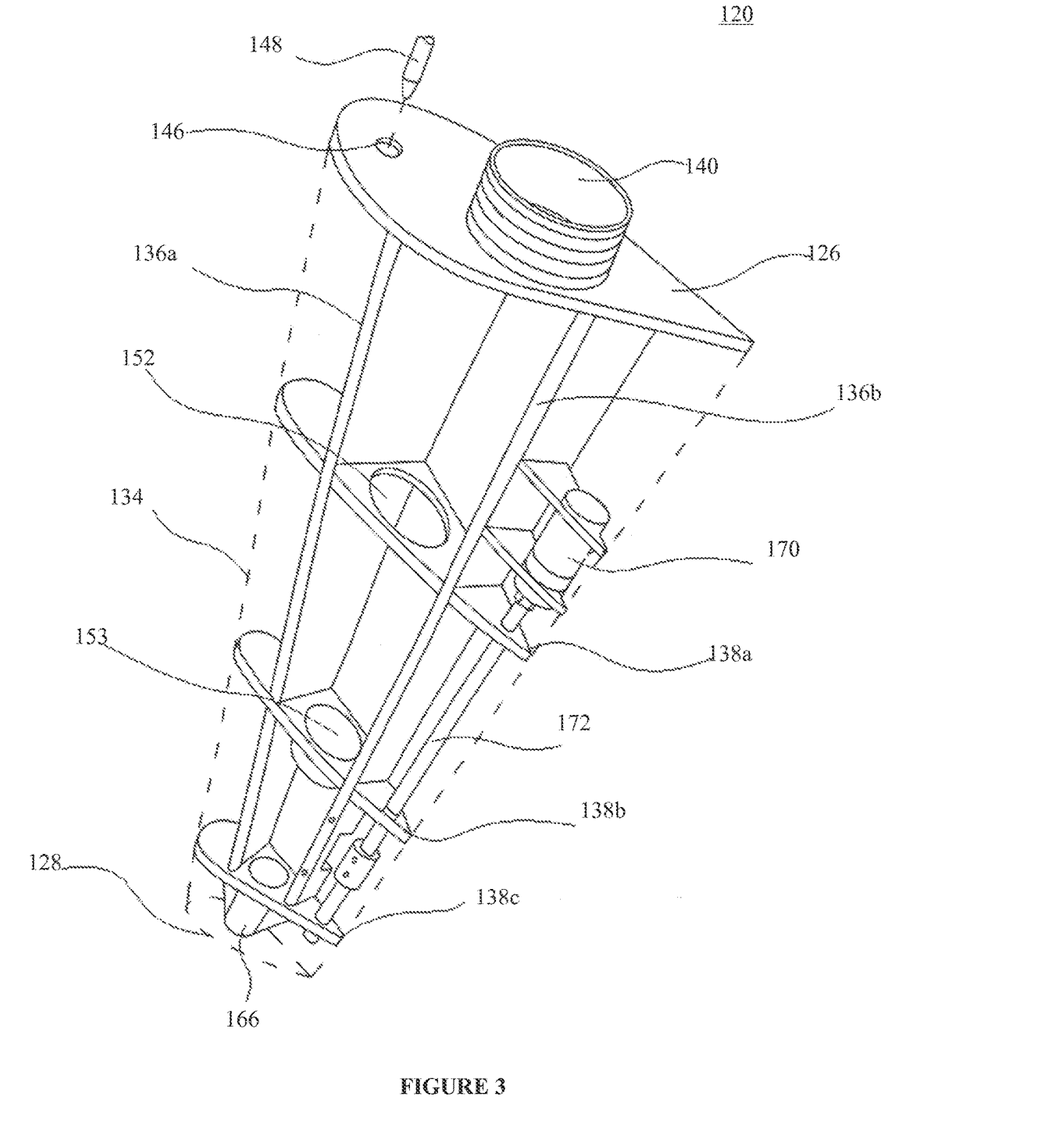
FIG. 3 illustrates a perspective view of the rotating wing tip shown in FIG. 1 with the wing skin removed.

Reference may now be made to FIG. 3 which shows a skeletal view of the rotating wing tip 120 having the wing skin 134 removed, as outlined by stippled lines. The wing tip 120 includes a pair of laterally extending spars 136a, 136b and a number of spaced apart ribs 138a, 138b, 138c forming the structural skeleton of the wing tip 120. Preferably the ribs 138a, 138b, 138c are equally spaced apart to provide balanced weight and structural stability.

The proximal end 126 of the rotating wing tip 120 defines a laterally protruding tubular bearing support 140. Two slip rings are located on the outside diameter of the bearing support to provide electrical contact for torque motor 170 of the brake mechanism. A tubular stub spar 142 (shown in FIG. 4) having one end supported by the main wing section 118 extends through the tubular bearing support 140. A ball or roller bearing 144 is disposed about the stub spar 142 and is received by the bearing support 140 of the wing tip 120. The roller bearing 144 rotatably couples the wing tip 120 to the main wing section 118 and is interposed between the stub spar 142 and the bearing support 140 to allow for the wing tip 120 to rotate freely about its rotational center 130 with respect to the main wing section 118.

The proximal end 126 of the rotating wing tip 120 also defines a locking aperture 146 which is sized to receive a sliding pin 148 of a wing tip locking mechanism arranged at the outboard end 124 of the main wing section 118. When engaged in a locking position, where the sliding pin 148 is received in the locking aperture 146, the rotating wing tip 120 is fixed (i.e. prevented from rotating) in a feathered position with an incident angle aligned with the main wing section 118. When the sliding pin 148 is released from the locking position, where the sliding pin 148 is removed from the locking aperture 146, and when the wing 116 is loaded due to the thrust of the aircraft 100, the rotating wing tip 120 is free to rotate about its rotational center 130 with respect to the main wing section 118.

Figure 4:
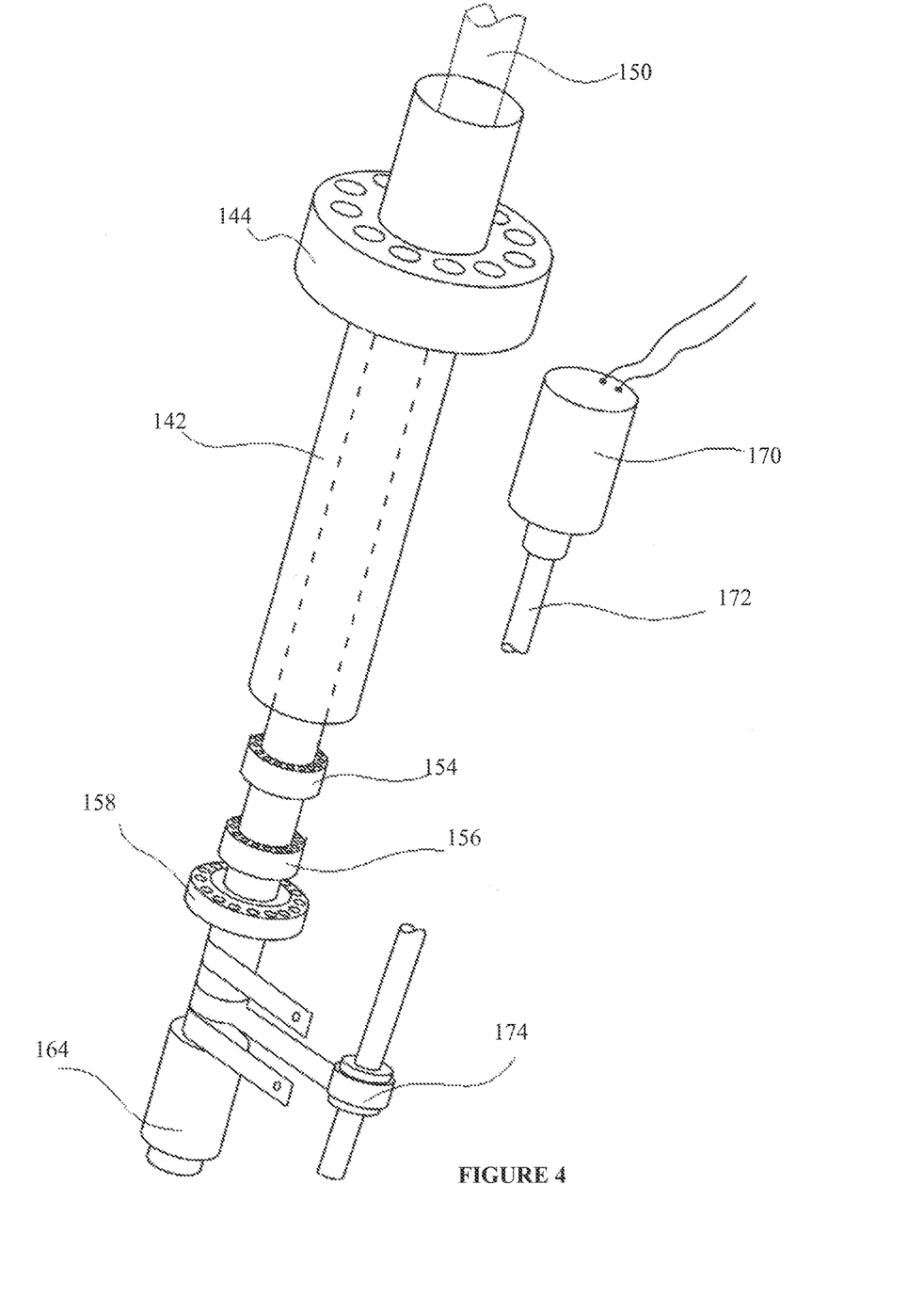
FIG. 4 illustrates an exploded partial perspective view of the drive and brake mechanism of the rotating wing tip shown in FIG. 1.
Figure 5:
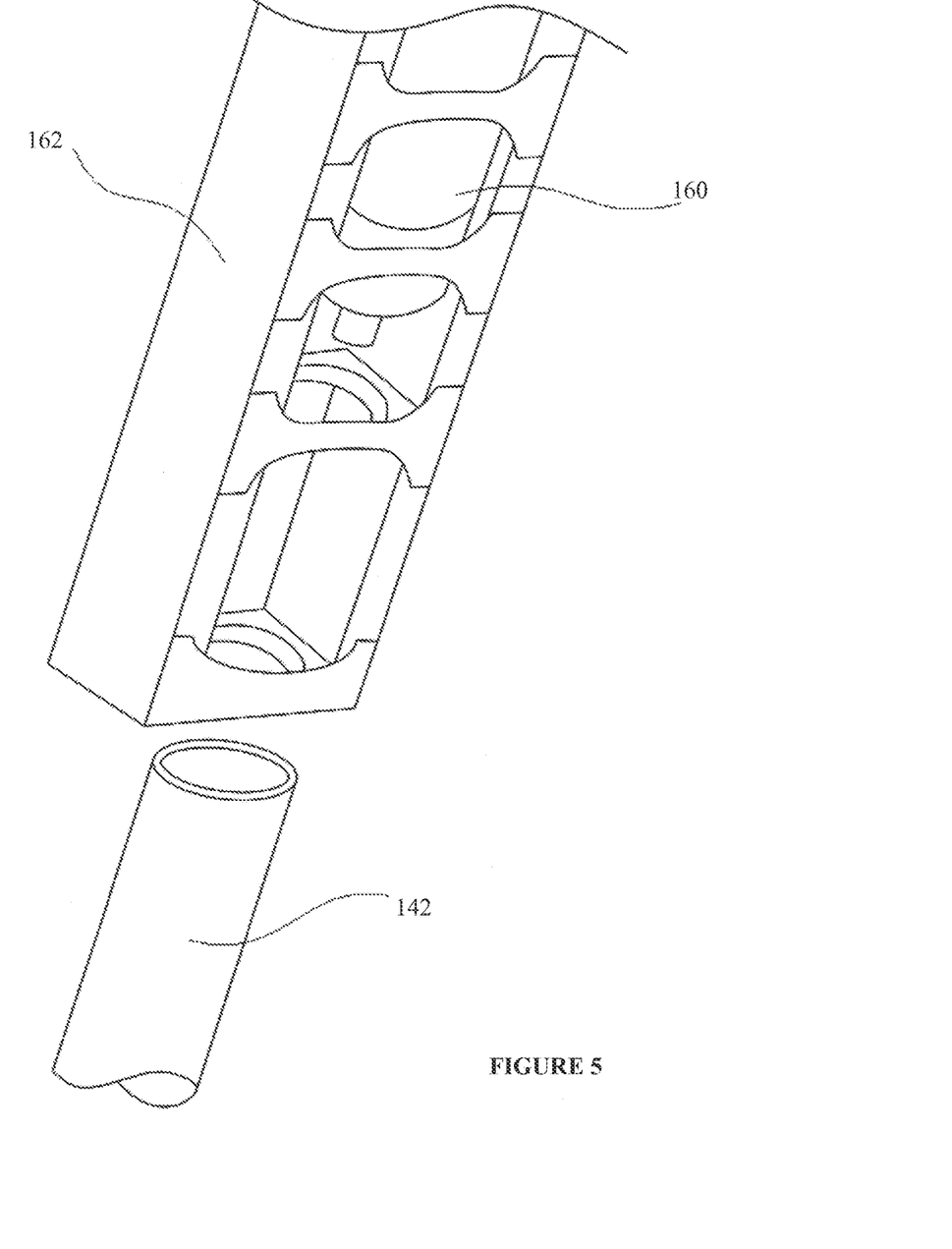
FIG. 5 illustrates an exploded partial perspective view of the torque motor and stub spar housed in the main wing section of the aircraft shown in FIG. 1.

FIG. 4 illustrates the drive assembly for the rotating wing tip 120. The drive assembly includes a drive shaft 150 which extends from the main wing section 118 through the tubular stub spar 142, clearance bore 152 defined by rib 138a, and bearing aperture 153 defined by the rib 138b, to the distal end 128 of the wing tip 120. The drive shaft 150 has disposed thereabout a second roller bearing 154 and a third roller bearing 156 which are positioned inside of the stub spar 142 and interposed there between (shown in the partially exploded view of FIG. 4) to rotationally support the drive shaft in the stub spar 142. A fourth roller bearing 158 is mounted on the drive shaft 150 and is received in the bearing aperture 153. Clearance bore 152 is sufficiently sized to allow the fourth roller bearing 158 to pass there through so that it can be received into aperture 153. The fourth 158 roller bearings provides rotational support for the wing tip 120.

A torque motor 160 equipped with an integral brake is coupled to a proximal end of the drive shaft 150 to rotationally drive and brake the drive shaft 150 when it is powered down. The start of rotation of the wing tip 120 is assisted by the torque motor 160 to spin up the wing tip 120 to the operating RPM.

The torque motor 160 may be arranged in the fuselage 102 or support structure 162 of the main wing section 118. Preferably, for variable wing tip profiles the drive shaft 150 of the opposing wings 116 are interconnected via the torque motor 160.

A one-way roller clutch 164 may be arranged on a distal end of the drive shaft 150. The roller clutch 164 is sized to be received by a clutch support housing 166 defined by the rib 138c at the distal end 128 of the wing tip 120. The roller clutch 164 allows for one-way up-rotation of the wing tip 120 with respect to the drive shaft 150 so that the wing tip 120 can rotate in the rotational direction at a speed faster than the rotation of the drive shaft 150 and/or if the drive shaft 150 is not rotating at all, as for example being arrested by the internal brake of the torque motor 160. The rotating wing tip 120 will lift in both directions, up or down, depending on the rotational direction involved.

Figure 8:
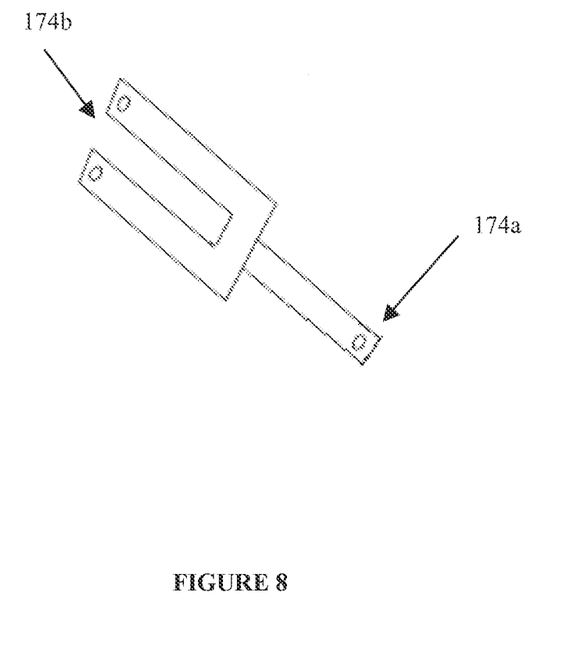
FIG. 8 illustrates a perspective view of the tension belt of the braking mechanism shown in FIG. 4.

A braking mechanism is provided to couple the rotation of the wing tip 120 to the drive shaft 150. Preferably, the braking mechanism is arranged inside of the rotating wing tip 120. The braking mechanism includes a braking torque motor 170 operably connected to a braking drive shaft 172, and a tension belt 174. The torque motor 170 includes an internal brake and can hold the rotational position of the braking drive shaft 172, and preferably includes a gear reduction assembly for lower RPM use. The torque motor 170 is operable to rotate the drive shaft 172 in a first direction to apply the braking force to the rotation of the wing tip 120 and when the rotation of the torque motor 170 is reversed, it releases the brake on the wing tip 120. As shown in FIG. 8, the fork like construction of the tension belt 174 includes one fixing end 174a and two forked fixing ends 174b. The tension belt 174 is wrapped about the drive shaft 150 of the drive assembly and the braking drive shaft 172 of the braking mechanism with the one fixing end 174a attached to the braking drive shaft 172 and the two forked fixing ends 174b attached to the spar 136b. In operation, the internal brake of the torque motor 160 brakes/stops the rotation of the drive shaft 150 while the wing tips 120 are free to rotate at their operating RPM. The braking torque motor 170 rotatably turns the braking drive shaft 172 in the first direction which because of the wrapped configuration of the tension belt 174, increases the tension in the tension belt 174 between the drive shaft 150 and braking drive shaft 172, which in turn couples the rotation of the wing tip 120 to the drive shaft 150, thereby braking the rotation of the wing tip 120. The angular displacement of the rotating wing tip 120 with respect to the main wing section 118 may also be adjusted in flight. For example, with the rotation of the wing tip 120 coupled to the rotation of the drive shaft 150 (i.e. a point where rotation of the wing tip 120 is locked to the stationary drive shaft 150), by rotating the drive shaft 150, the wing tip 120 can be rotated to a desired incident angle or returned to the feathered position where the incident angle of the wing tip 120 is aligned with the main wing section 118. By reversing the rotation of the torque motor 170, the tension in the tension belt 174 is relaxed and the braking force applied to the wing tip 120 is removed.

Figure 6:
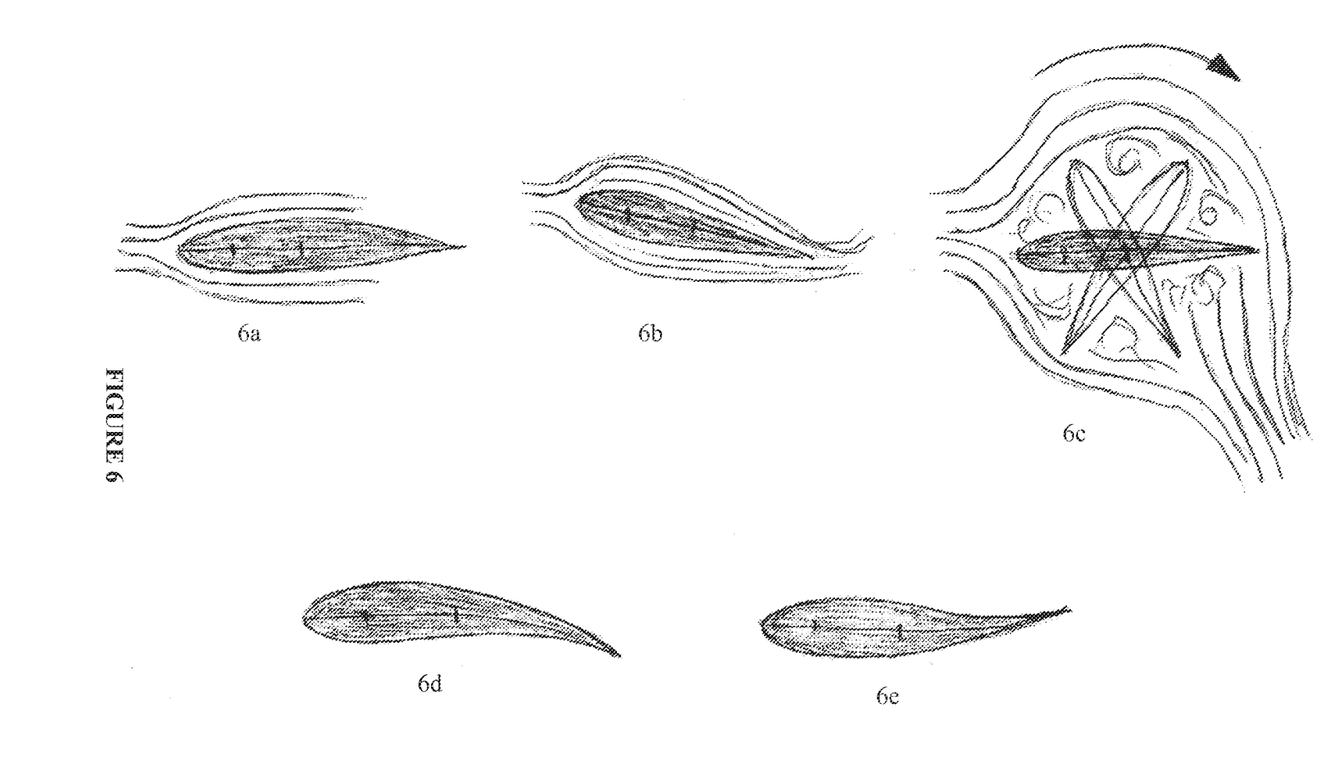
FIG. 6 shows schematic illustrations of: (a) a symmetrical aerodynamic shape at 0 degree angle of attack; (b) a symmetrical aerodynamic shape at approximately 2 degrees angle of attack; (c) a symmetrically aerodynamic shape under full rotation (tumble) with high lift coefficient (d) a positively cambered aerodynamic shape; and (e) a negatively cambered aerodynamic shape.

Rotating wing tips in accordance with the present disclosure reduce or eliminate the stall-spin dangers noted and described earlier. As a simple explanation, an aerodynamic shape (for example, a symmetrical wing profile shown in FIGS. 6a and 6b) will only generate useful lift if the aerodynamic shape is positively angled to the local airflow and moving with respect to the airflow mass in which it is immersed.

As shown in FIG. 6a, at zero degree angle of attack, the air particles are forced to accelerate above and below the symmetrical profile of the aerodynamic shape at equal speeds, and therefore no lift is generated in either direction, up or down. If the aerodynamic shape is rotated up (clockwise) a few degrees as shown in FIG. 6b (i.e. approximately 2 degrees), the airflow will be faster over the upper side of the aerodynamic shape and slower under the lower side of the aerodynamic shape. The faster moving lower pressure airflow above the aerodynamic shape provides approximately ⅔ of the lift generated, while the higher pressure, lower speed airflow below the aerodynamic shape, provides approximately ⅓ of the lift generated by the aerodynamic shape. The two airflows (upper and lower) reunite at the rear of the aerodynamic shape, and produce a rotating vortex due to the differential speed and pressure of the two airflows. A rotating vortex at the rear of the aerodynamic shape imparts a slight downward load against the trailing edge of the aerodynamic shape generating a slight pitch up torque to the leading edge of the aerodynamic shape. The combination of reduced pressure, which is at about 25% at the upper front leading edge of the aerodynamic shape, and the rear rotating vortex together produce a powerful pitch up torque.

Presently, in general aviation this torque is not utilized and is arrested by the wing structure, i.e. spars, ribs, wing skin, etc. In the case of the freely rotatable wing tip in accordance with the present disclosure, if the wing tip is allowed to freely rotate about its rotational center (middle point), and if the wing tip is sufficiently thin, i.e. 6-20% of the median chord length of the wing tip (average chord length between the root and tip chord length) and has a sufficient mass, it will self-start/auto-rotate due to the airspeed involved and maintain a continuous auto rotation. This lift vortex-induced, end-over-end, autorotation is known as tumble.

Tumble occurs in general aviation when the centre of gravity of the aircraft is set close to, on, or behind the centre of lift of a wing or aircraft. At a sharp pull up, the aircraft continues to rotate upward end-over-end uncontrollably, while sinking at a very high rate. The high sink rate is due to the entire mass of the aircraft rotating in a very slow 360 degree tumble. This rotation is always induced upwards due to the lift vortex involved in a pull up. The wing may not reach its lift vortex-induced optimum R.P.M. The aircraft will rapidly lose air speed and altitude until it eventually crashes.

This situation is typically related to an all wing or flying wing aircraft because of the narrow centre of gravity range and the low aerodynamic damping available due to the lack of a horizontal stabilizer. There is no recovery from this condition.

To date, a practical application of the "tumble phenomenon" has not been realized. The present disclosure has been demonstrated on full scale and sub-scale wing sections and shown that an freely/auto-rotating wing tip will not stall due to the rotating lift vortex that is attached and shed during the 360 degree rotational cycle of the freely rotating wing tip. It has been appreciated that the rotating wing tip produces approximately an equal lift coefficient as when the same wing section is statistically angled to its maximum angle of attack, i.e. 15-17 degrees.

The main difference is that the rotating wing tips avoids stall and produces a larger coefficient of drag due to its profile drag, which includes two times perpendicular (90 degree and 270 degree position) against the apparent airflow during one full rotation. The torque generated to rotate the wing tip is maintained as long as the wing is loaded, i.e., supporting its own weight (in the air) and the structure it is attached to.

Generally, when operating an aircraft, a high aerodynamic drag is necessary for landing, manoeuvring, while the aircraft is slowing down to descend, and to touchdown with a minimum of ground speed. Conventionally, this is done through the use of leading and trailing edge flaps. The use of leading and trailing edge flaps is two fold: First, the flaps are usually located at the inner part of the wing, increasing the lift coefficient only at the inner part of the wing and not at the tips leaving the tips in a lower lift coefficient condition, thereby reducing the lateral stability of the aircraft. Second, when the flaps are applied the drag will also be high while increasing the lift coefficient. In this combination, the aircraft will slow down, and start to sink more rapidly which will push the wing closer to a full stall and further reduce lateral stability. Further, if the flaps are extended to the wing tips, as in the case of a flaperon configuration, then the danger of wing tip stalling becomes even greater at a high angle of attack condition. Also, the standard recovery of aircraft from a spiral dive is to use the rudder to "kick" the lower wing forward into the apparent airflow which will increase the airspeed lifting the down-going wing.

Figures 7A, 7B:
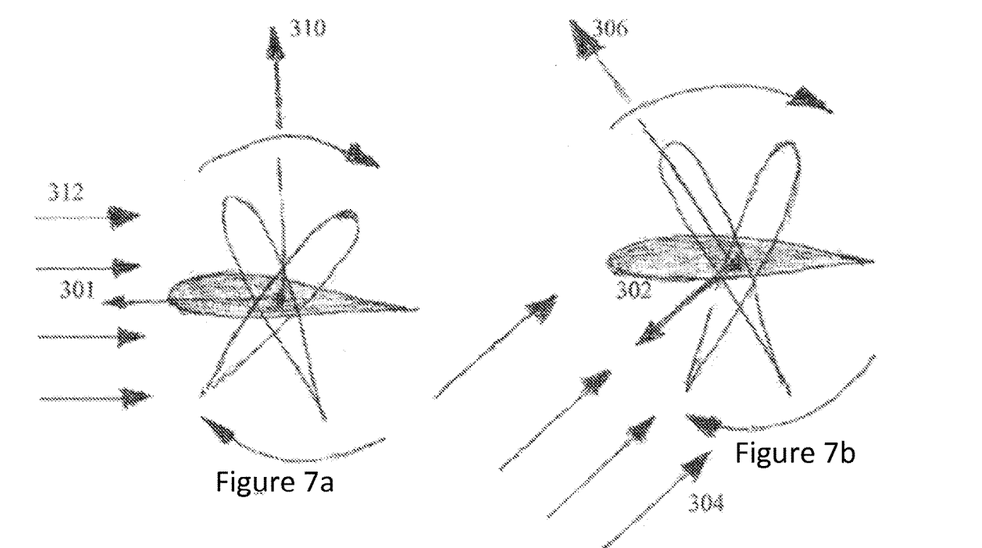
FIGS. 7a, 7b and 7c shows schematic illustrations of a rotating aerodynamic shape moving forwards into the airflow; sinking towards the airflow; and encountering an upward airflow, respectively.
Figure 7C:
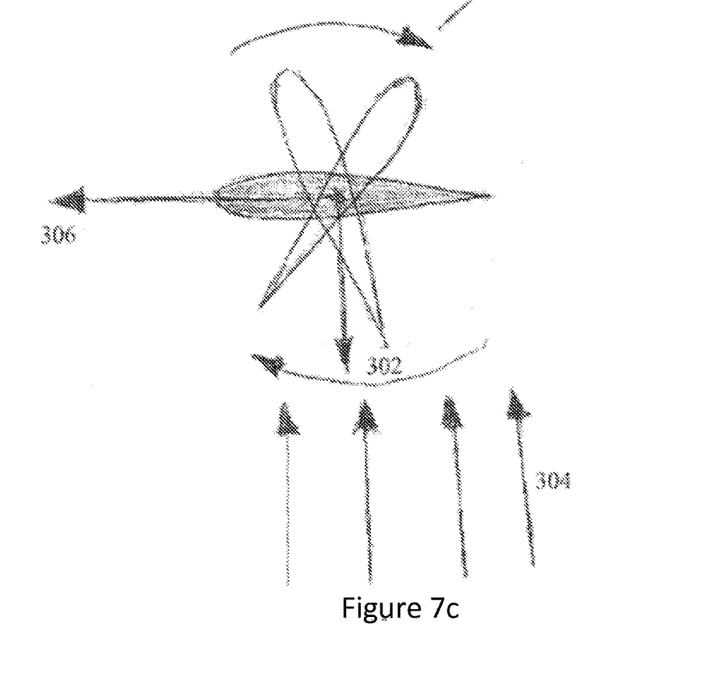

In contrast to these general aviation techniques, when the rotating wing tips of the present disclosure are released from their locked position and allowed to freely spin/rotate, the lift is increased at the wing tips, enhancing the lateral stability of the wing as well as providing high lift, even when the wing is experiencing an increased sink rate. The increasing sink rate will add to the apparent airflow speed about the rotating wing tips due to the 360 degree rotation of the wing tip involved. Because the rotating wing tips are rotating freely, the horizontal and vertical airflow movements equally influence the lift produced at the wing tips. As illustrated in FIG. 7a, the normal lift vector 310 of a rotating wing tip in accordance with the present disclosure moving forward in the airflow 312 is upward, approximately perpendicular to the direction of travel 301 against the apparent airflow 312. As shown in FIGS. 7b and 7c, when the rotating wing tip is sinking or encounters an upward airflow 304, an additional lift vector 306 develops towards the direction of travel 302 (again, the lift vector acts at approximately 90 degrees to the apparent airflow 304). This will thrust the down-going wing tip (and wing/aircraft the wing tip is attached to) forward into the apparent airflow 304 due to the 360 degree rotation of the wing tip, increasing the air speed to the static wing it is attached to. This automatic occurrence of the rotating wing tip is self-levelling, maintaining lateral orientation of wing and aircraft.

This self-levelling feature of the rotating wing tip has been tested on a free flying model and proven to exist. The test model was a modified commercially available, compressed air pressure driven "AIR HOG ST 9 Turbo Chopper", a free flying model plane with vertically oriented wing tips blades removed and replaced by rotating wing tips in accordance with the present disclosure. To further test the rotating wing tip stabilizing effect, the horizontal stabilizer of the model was also removed.

In this configuration the climb angle was managed by setting the centre of gravity to the rear, and later even further beyond the centre of lift of the wing. This position was considerably further back than the maximum rear centre of gravity allowed by the original model. The lack of the horizontal stabilizer as well as the extreme rear shifted centre of gravity had little to no effect on the aerodynamic stability of the test model. The test model climbed at an extreme angle, and as the pressurized air supply diminished and the propeller slowed down, the wing in a high angle attack, the model descended in a steep sinking glide to the ground under complete automatic lateral control (with the rotating wing tips still rotating).

The application parameters of the rotating wing tips are similar to wing flaps and other conventional high lift devices. Deployment of a flap for example should only be applied at low enough air speeds that will not cause structural damage to the rest of the wing or aircraft structure. The application of the rotating wing tip should also preferably be applied during low speeds to prevent structural damage. Most preferably, the lift generated by the rotating wing tips are best utilized during takeoff and landing of the aircraft, and during very slow turns. In practical applications, preferably the rotating wing tips are locked by the locking mechanism to the main wing section at the same incident angle as the rest of the wing during high speed cruise range, and allowed to rotate only during the low speed manoeuvres.

In use, during start up, the rotating wing tips produces a variable cycle lift that will increase to maximum as the wing tip rotates up to 90 degrees. As the wing tip continues to rotate due to the mechanical mass inertia of the wing tip, the generated lift will slowly be reduced from the maximum down to the 180 degree point. This cycle will repeat 2 times in one full revolution. As the wing tip continues to rotate (accelerate and fully load up) it will reach a steady state of dynamic lift-induced R.P.M., generating quasi-even lift due to the inertia of air particles and the attached and shed airflow. This induced R.P.M. depends on the median chord length of the wing tip, the wing tip loading (i.e. how much weight the wing tips are supporting) and the airflow speed involved, horizontal or vertical. The smaller the median cord length the lower the variation of the lift generated; as well, the lower the drag throughout the 360 degree lift cycle and the higher the induced R.P.M. of the rotating wing tip.

In a preferred practical application, the rotating wing tips are rotated during slow speed flight only and are allowed to freely rotate in the up direction (clockwise) providing enhanced lateral stability. In this combination, conventional ailerons are used for lateral control in all flight range and are mounted on the main wing section.

In a preferred technique to employ a rotating wing tip equipped aircraft, during take off the aircraft is accelerated to the lift up speed with the wing tips locked in their feathered position at an incident angle aligned with the main wing section (for low drag acceleration), then released by the locking mechanism, which allows the wing tips to freely rotate/spin up to their operating R.P.M (rotation may be assisted by torque motor 160). Now the main wing section (aircraft) may be pitched to its maximum angle of attack and/or the inboard flaps may be applied, without the danger of the wing tips stalling with its attendant lateral stability loss. After the aircraft reaches the desired altitude, a steep climb should be initiated to load up the main wing section and to unload the rotating wing tips. At this point, the braking mechanism is applied and the rotation of the wing tips are braked. As the wings tips are slowed down below the lift-induced rotational R.P.M, the rotation is stopped with the wing tips set at an approximate vertical position (90 degree). This position is an aerodynamically stable static position approximately perpendicular to the direction of travel (of the aircraft). Now, the wing tips are rotated forwardly by the drive shaft 150 (counter clockwise with the brake mechanism applied) aligning the wing tips with the main wing section, and locked in place by the locking mechanism in the feathered position. In this feathered position the wing tips are entirely streamline with the main wing section.

In a preferred technique to land an aircraft employing the rotating wing tip, the aircraft is decelerated, for example over a landing field, by a steep climb close to the lift off speed of the aircraft and leveled off, then the rotating wing tips are released from their locked position. As the wing tips load up and reach their steady state lift-induced R.P.M., the entire wing will return to the dynamically stabilized spin-proof configuration. In this configuration, landing into a small spot is made quite easy. Simply set the aircraft to a continuous turn above the landing spot, with or without the inboard flaps and "spiral" in without fear of stalling the wing tips and losing lateral control. Before touch down, level the aircraft pulling up and land into the prevailing wind by allowing the aircraft to stall and settle in.

An alternative aerodynamic configuration may be made by utilizing the rotating wing tips for lateral stabilization as well as control during the dynamic and static range of flight. In this application, the aerodynamic shape of the rotating wing tip profile may be reconfigured in flight, i.e. changed from a basic symmetrical airfoil (FIG. 6*a*), to a positively (FIG. 6*d*) or negatively cambered profile (FIG. 6*e*). A positively cambered airfoil will be unstable (it will pitch down), but it will produce a higher coefficient of lift than a symmetrical airfoil. A negatively cambered airfoil will be stable (it will pitch up) but it will produce a lower coefficient lift than a symmetrical foil. A variable cambered rotating wing tip may be the most efficient aerodynamic application of the wing tip-stabilized aircraft wing. In this configuration the rotating wing tip may occupy up to 40% of the total surface area of the wing.

In the static mode the same camber changing mechanism is used for the aileron function as for the dynamic mode function. The mechanical actuating components are more complex than the inboard aileron (mounted on the main wing section) and the rotating wing tip combination described earlier, but it allows a more efficient, larger rotating wing tip to be utilized into the total wing area. As for example, at the high speed range of flight, while the wing tips are operating in a "static" mode and are not spinning, the aileron function may be achieved by changing the angle of attack of the wing tips in relation to the main wing section they are attached to (i.e. reduced lift at the lower angle of attack, and increase lift at the higher angle of attack). Also, in static mode, if one wing tip is made to be positively cambered and the other wing tip negatively cambered, the aircraft will turn in the direction of the negatively cambered wing direction due to the lower lift generated on that side.

For an aerodynamically self-driven rotating wing tip system, the left and right wing tips are preferably mechanically interconnected in order to maintain auto-rotation while the wing tips are free to rotate (dynamic mode). This is due to the changing pitching moment of the wing tips while functioning as ailerons. As one wing tip is configured to provide higher lift (this profile change will reduce the lift induced autorotation to the point of stopping it), the opposing wing tip is configured to produce lower lift (this profile change will increase the lift-induced autorotation force). By linking the left and right wing tips, the torque needed to maintain the autorotation for both wing tips is preserved, and the lift differential needed for the aileron function is achieved purely by changing the camber of the wing tips, in both static and dynamic mode. This may be accomplished by adjusting the trailing edge and/or leading edge (similar to conventional flaps) or by using a flexible wing tip construction.

An additional increase of lift coefficient is achievable if the dynamic lift-induced R.P.M. is exceeded by the wing tips, i.e. motor driven rotating wing tips. This is due to the "Kramer or Magnus effect", (Kutta-Joukowski theorem) that is, additional lift produced by the induced rotational circulation around the accelerating wing tips. As for a practical application of motor-driven rotating wing tips, several possible combinations of lift generation may be employed. An independent wing tip drive mechanism allows rapid cyclic application of the individual wing tips (left side wing tip and right side wing tip) from the feathered position momentarily stopped at the 90 degree up position and back, in a repeated cycle, in place of a full 360 degree rotation. As for example, if the rotating wing tips are coupled to the torque motor, then the overall wing tip coefficient may be increased through the use of high lift, positively cambered airfoils. In this configuration the rotating wing tip rotation is provided by the torque motor (not only by the dynamic lift force) and it is not dependant on the shape or profile of the wing tip design while functioning in the dynamic lift mode. As the wing tip is accelerated by the torque motor beyond the lift-induced R.P.M., the volume of the rotating air mass that is attached to the airfoil and shed periodically will increase due to the viscosity of the air and the inertia of the air particles. In this configuration the differential rotational speed between the left and right wing tips may be used as a lateral control during the dynamic lift mode. In this arrangement the wing tips are operating in an accelerated dynamic lift mode, and if pulsed (i.e. bursts of increase R.P.M) additional lift will be generated periodically at the beginning of each burst due to the unsteady aerodynamic lift generation. The limiting factor to this accelerated dynamic lift mode is the rotational aero drag which is related to the apparent or added air mass that is driven by the wing tip, requiring a large amount of torque beyond the self induced rotational R.P.M.

Figures 9A, 9B:
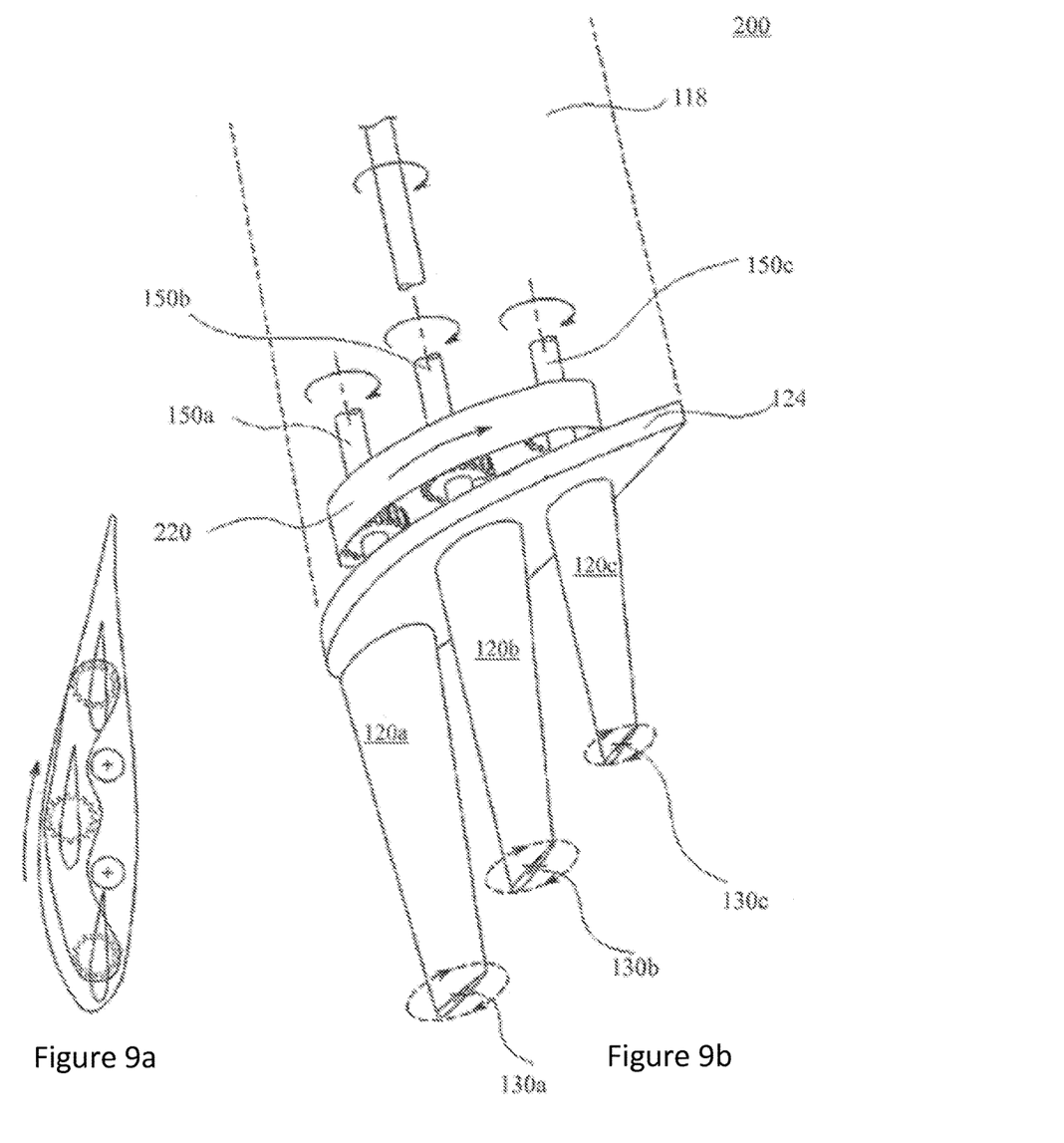
FIGS. 9a and 9b illustrates, in side elevation partial cutaway and rear isometric partial cutaway views, respectively, a wing having multiple rotating wing tips in accordance with another embodiment of the present invention.

The present invention may also be employed with a wing 200 having multiple wing tips as illustrated in FIGS. 9*a* and 9*b*. The construction of the wing 200 is similar to wing 116 and includes a main wing section 118 (shown in stippled lines) having an outboard end 124. Multiple wing tips 120*a*, 120*b*, and 120*c* are rotatably mounted to the outboard end 124 of the main wing section 118 so as to be rotatable about their respective rotational centers 130*a*, 130*b* and 130*c*, respectively. Preferably the multiple wing tips 120*a*, 120*b* and 120*c* are in a staggered arrangement, which avoids blocking of air flow around the wing tips. Preferably each wing tip 120*a*, 120*b* and 120*c* is also of different lateral lengths. For example, the leading wing tip 120*a* may have a greater lateral length then wing tip 120*b*, and wing tip 120*b* has a greater lateral length then wing tip 120c. Each wing tip 120a, 120b and 120c may include independently driven drive shafts 150a, 150b and 150c, respectively. Alternatively, the rotation of each drive shaft 150a, 150b and 150c may be linked together by gear and toothed belt assembly 220, rotatably coupling the respective drive shafts 150a, 150b and 150c at the same R.P.M.

To the extent that a patentee may act as its own lexicographer under applicable law, it is hereby further directed that all words appearing in the claims section, except for the above defined words, shall take on their ordinary, plain and accustomed meanings (as generally evidence, inter alia, by dictionaries and/or technical lexicons), and shall not be considered to be specially defined in this specification. Notwithstanding this limitation on the inference of "special definitions," the specification may be used to evidence the appropriate, ordinary, plain and accustomed meanings (as generally evidenced, inter alia, by dictionaries and/or technical lexicons), in the situation where a word or term used in the claims has more than one pre-established meaning and the specification is helpful in choosing between the alternatives.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure had described and illustrated certain preferred embodiments of the invention, it is to be understood that the invention is not restricted to these particular embodiments. Rather, the invention includes all embodiments, which are functional, electrical or mechanical equivalents of the specific embodiments and features that have been described and illustrated herein.

We claim:

1. An aircraft operable to cruise and maneuver through a range of flight speeds comprising: a fuselage extending from a nose end to a tail end along a longitudinal axis; and first and second wings attached to opposing sides of the fuselage, wherein the first and second wings each comprise:
    a main wing section extending from an inboard end to an outboard end along a lateral axis of the aircraft, the inboard end for connecting the main wing section to the fuselage; and
    at least one wing tip having a proximal end and a distal end, the at least one wing tip being rotatably mounted at the proximal end to the outboard end of the main wing section and arranged to freely autorotate through at least 360 degrees of motion with respect to the main wing section in response to airflow incident on the at least one wing tip about a wing tip rotational center that is aligned in parallel or coaxially aligned with the mean lift line of the wing.

2. The aircraft according to claim 1, wherein a total surface area of the wing tip is between 2% to 20% of a total surface area of the aircraft wing.

3. The aircraft according to claim 1, wherein a thickness of the wing tip is between 6% to 20% of a median chord length of the wing tip.

4. The aircraft according to claim 1, wherein the wing tip rotational center is arranged proximal to a mean lift line of the main wing section.

5. The aircraft according to claim 4, wherein the wing tip rotational center of at least one wing tip and the mean lift line of the main wing section are coaxially aligned.

6. The aircraft according to claim 1, wherein the main wing section comprises a static wing or fixed wing.

7. The aircraft according to claim 1, further comprising a locking mechanism operable to fix the wing tip to the main wing section in a locked position preventing rotation of the wing tip, and operable to release the wing tip from the locked position where the wing tip is free to rotate about the wing tip rotational center, wherein in the locked position the wing tip is in a feathered position where an incident angle of the wing tip is aligned with the main wing section.

8. The aircraft according to claim 7, wherein the locking mechanism comprises a sliding pin and an associated locking aperture sized to receive the sliding pin.

9. The aircraft according to claim 8, wherein the proximal end of the autorotating wing tip defines the associated locking aperture and the sliding pin extends from and retracts toward the outboard end of the main wing section.

10. The aircraft according to claim 1, further comprising a tubular stub spar extending from the main wing section for each wing tip.

11. The aircraft according to claim 10, further comprising a roller bearing disposed about the tubular stub spar, wherein the proximal end of the wing tip defines a laterally protruding tubular bearing support sized to receive the roller bearing.

12. The aircraft according to claim 11, wherein the tubular stub spar extends through the bearing support, and the roller bearing is interposed between the tubular stub spar and the bearing support to rotatably couple the wing tip to the main wing section.

13. The aircraft according to claim 10, further comprising a drive assembly for rotationally driving the wing tip, the drive assembly comprising a torque motor coupled to a drive shaft which extends from the main wing section through the tubular stub spar and engages the wing tip.

14. The aircraft according to claim 13, further comprising a roller clutch arranged between the drive shaft and the wing tip, the roller clutch being sized to be received by a clutch support housing defined by the distal end of the wing tip, the roller clutch operable for one-way up-driving of the wing tip with respect to the drive shaft so that the wing tip is rotatable in a rotational direction at a speed greater than the rotational speed of the drive shaft.

15. The aircraft according to claim 14, further comprising at least one roller bearing disposed about the drive shaft and interposed between the drive shaft and the tubular stub spar for rotational support of the drive shaft.

16. The aircraft according to claim 15, wherein the torque motor is arranged in the main wing section.

17. The aircraft according to claim 1, further comprising a braking mechanism operable to apply a braking force to stop the autorotation of the wing tip.

18. The aircraft according to claim 17, wherein the braking mechanism is operable to rotate the wing tip to a desired incident angle with respect to the main wing section and return the wing tip to the feathered position where the incident angle of the wing tip is aligned with the main wing section.

19. The aircraft according to claim 18, wherein the braking mechanism is arranged in the wing tip.

20. The aircraft according to claim 1, wherein the autorotation of the wing tip of the first wing and the autorotation rotation of the wing tip of the second wing are mechanically linked to one another.

21. The aircraft according to claim 20, wherein the autorotation of the wing tip of the first wing and the autorotation of the wing tip of the second wing are differentially driven.

22. The aircraft according claim 20, wherein the autorotation of the wing tip of the first wing and the autorotation of the wing tip of the second wing are motor driven independently from one another.

23. The aircraft according to claim 1, wherein the autorotation of the wing tip of the first wing and the autorotation of the wing tip of the second wing are motor driven independently or intermittently from one another.

24. The aircraft according to claim 1, wherein the aircraft is selected from one of a general aviation aircraft, ultra light aircraft, a glider, a compound helicopter and a sailplane.

25. The aircraft according to claim 1, wherein the wing tip of the first wing and the wing tip of the second wing can be reconfigured during flight.

* * * * *